United States Patent [19]

Wallace et al.

[11] Patent Number: 4,659,092
[45] Date of Patent: Apr. 21, 1987

[54] MECHANICAL SEALS

[75] Inventors: Neil M. Wallace, Manchester, England; Jacobus A. M. ten Houte de Lange, Wassenaar, Netherlands

[73] Assignee: Flexibox Limited, Manchester, England

[21] Appl. No.: 735,083

[22] Filed: May 16, 1985

[30] Foreign Application Priority Data

May 19, 1984 [GB] United Kingdom ............... 8412875

[51] Int. Cl.⁴ .................. F16J 15/16; F16J 15/34; F16J 15/54; F16B 4/00
[52] U.S. Cl. ............................... 277/5; 277/9; 277/81 R; 277/84; 277/87; 277/93 SD; 277/96; 285/381
[58] Field of Search ........... 285/381; 277/81 R, 93 R, 277/93 SD, 236, 85, 87, 5, 7, 84, 9, 96

[56] References Cited

U.S. PATENT DOCUMENTS

| | | | |
|---|---|---|---|
| 1,340,650 | 5/1920 | Deranek | 277/194 |
| 1,687,343 | 10/1928 | Madden | 285/381 X |
| 2,836,440 | 5/1958 | Brumagim | . |
| 2,951,719 | 9/1960 | Porges | 277/93 SD X |
| 2,995,390 | 8/1961 | Gardner | . |
| 3,305,841 | 5/1962 | Riester | 277/83 X |
| 3,356,378 | 12/1967 | Tracy | 277/81 R |
| 3,770,181 | 11/1973 | Stahl | 277/81 R |
| 3,811,687 | 5/1974 | Honold et al. | . |
| 4,145,059 | 3/1979 | Imai et al. | 277/81 R |
| 4,415,164 | 11/1983 | Johnson | 277/93 R X |
| 4,543,011 | 9/1985 | Lindenthal | 285/381 X |

FOREIGN PATENT DOCUMENTS

| | | |
|---|---|---|
| 2156953 | 5/1973 | Fed. Rep. of Germany . |
| 564720 | 10/1944 | United Kingdom . |
| 573911 | 12/1945 | United Kingdom . |

Primary Examiner—Allan N. Shoap
Attorney, Agent, or Firm—Woodard, Weikart, Emhardt & Naughton

[57] ABSTRACT

In a mechanical seal, a seal face member is compressed by a shrink fitted squeeze ring onto a spigot of a carrier forming one of two seal elements. This arrangement reduces distortion of the seal face and shrouds the seal member from attack by a fluid product in the space. Distortion of the seal face is further discouraged by also shrink fitting the squeeze ring onto the carrier. The squeeze ring circumferentially abuts the face seal member and either radially or circumferentially abuts the carrier to provide structural stability and to shroud the face seal member on three sides leaving only the seal face exposed. The squeeze ring can be arranged internally of the seal face member with the spigot on the carrier arranged externally. In either event the seal face member, usually constructed from carbon is held under radial compression for increased strength.

5 Claims, 6 Drawing Figures

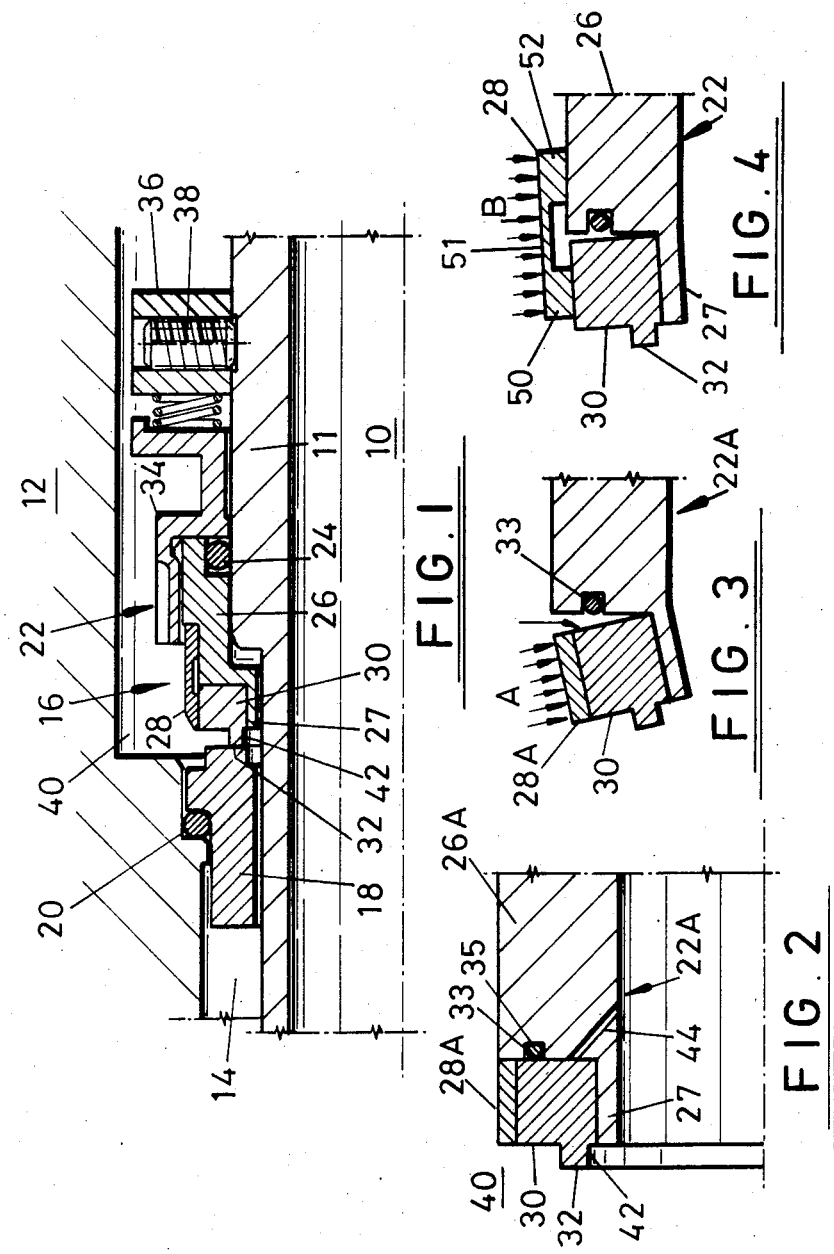

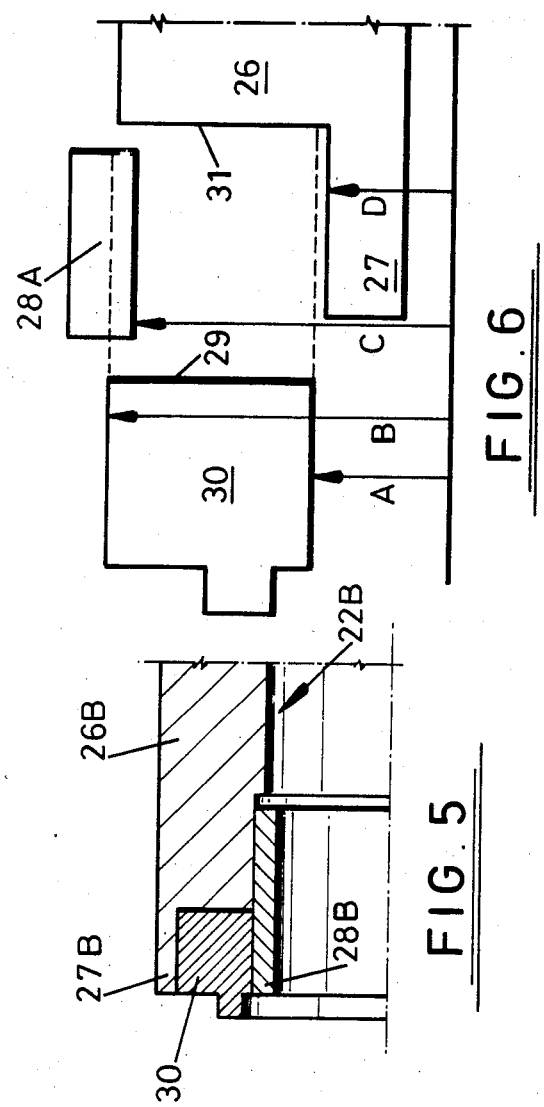

MECHANICAL SEALS

This invention relates to mechanical seals of the type employed to seal a rotary shaft exiting a housing containing fluid to be sealed in the housing.

Such seals may comprise a stationary seal element adapted to be sealed in the housing and a rotary seal element adapted to be sealed to the shaft, the seal elements each having an annular seal face adapted to surround the shaft and be urged towards one another to form a running seal between said seal faces. Such seals are hereinafter referred to as of "the type defined".

The seal faces are usually constructed from materials of different hardness so that generally only one face, that is the softer face, wears in use and hence both retain relatively flat faces. This ensures the integrity of the running seal. Further it is usual that the softer seal face has a smaller surface area so that the whole of its face wears. This also helps retain flat mating surfaces between the seal elements.

The choice of materials for the seal faces depends on a number of factors including temperature, pressure, speed of rotation, cost and compatibility with the product to be sealed.

Where the product is particularly aggressive it is common to employ a double seal which defines a space between the shaft, housing and the two seals. This space is filled with a barrier fluid under pressure greater than the product pressure. Thus any leakage between the primary seal faces is by the barrier fluid into the product rather than the other way round. Hence the film between the seal faces is barrier fluid which can be chosen for its lubricating, non-aggressive characteristics such that the seal faces have an extended working life. Perhaps more importantly however, should the primary seal fail there is a secondary seal back-up to prevent escape of the product while the plant is being shut down for repair of the seal.

One material which is commonly used as the softer face is carbon or a carbon based material. This has several desirable characteristics which dictate its use in many applications but in some applications the conditions are such that carbon would be the ideal material except that the product in question is somewhat aggressive to the carbon and can cause seal failure through carbon deterioration.

While carbon is soft compared to say mild steel which might be employed as the hard seal face, it is nevertheless brittle and only has sufficient strength and integrity to avoid breaking up in the environment of a seal face if it is placed under compression. Thus the carbon ring has hitherto sometimes been shrink fitted inside a steel support ring forming the main body of the seal element. Also, being relatively soft carbon is prone to distortion in use which can lead to uneven face loads and face wear and indifferent sealing.

A mechanical seal of the type hereinbefore defined is known in which the abovementioned problems either do not occur or are at least reduced in their severity. Such mechanical seal has one seal element comprising a carrier having an annular spigot on which a seal face member is carried, and a squeeze ring shrink fitted onto the seal face member to compress the latter against the carrier.

With this known mechanical seal, the face seal member, which is usually carbon is squeezed between two surfaces and supported against a third so that the probability of seal face distortion is considerably reduced.

In such known mechanical seal, however, the squeeze ring has a spatial relationship with the carrier, i.e. the contact between them is an indirect one solely through the intermediary of the seal face element supported on the carrier spigot and this provides a potentially unstable structure which can result in separation of the components (carrier, seal face element and squeeze ring) caused, for example, by twisting of the spigot which is cantilevered relative to the carrier or by an excess of fluid pressure applied to the mechanical seal.

It is an object of the present invention to obviate or mitigate this drawback.

According to the present invention there is provided a mechanical seal of the type hereinbefore defined in which one seal element comprises a carrier having a spigot, a seal face member supported by the spigot, and a squeeze ring shrink fitted onto the seal face member to compress the seal face member against the carrier, the mechanical seal being characterised in that the squeeze ring is in abutting relationship with the carrier to give structural rigidity to the seal element.

This abutment between the squeeze ring and the carrier provides a resistance to the aforesaid separation and especially a resistance to any twisting tendency of the cantilevered spigot of the carrier.

This abutment which may be radial or circumferential, between the squeeze ring and the carrier has the further advantage that it ensures that the face seal member is shrouded on three sides, the fourth side being the seal face, so that the area for attack by an aggressive fluid product is considerably reduced and the likelihood of deterioration of the carbon is correspondingly reduced.

The mechanical seal may be modified by shrink fitting the carrier onto the face seal member instead of the squeeze ring.

Preferably the squeeze ring is also an interference shrink fit in or on the carrier. This further reduces the likelihood of distortion of the seal face because in this arrangement the squeeze ring holds the seal face in position against the carrier.

The invention is further described hereinafter, by way of example only, with reference to the accompanying drawings, in which:

FIG. 1 is a section through a mechanical seal according to the present invention;

FIG. 2 is a section through a seal element for use in a mechanical seal in accordance with the present invention;

FIG. 3 shows how a seal element as illustrated in FIG. 2 might deform under hydrostatic pressure;

FIG. 4 shows how such deformation may be resisted in a modified form of the seal element illustrated in FIG. 2;

FIG. 5 is a section through another seal element also for use in a mechanical seal according to the present invention; and FIG. 6 shows the parts of the seal element of FIG. 2 before assembly.

In FIG. 1 a shaft 10 rotates in a housing 12 containing fluid 14 to be sealed in the housing. A mechanical seal 16 comprises a stationary seal element 18 mounted in the housing 12 via an O-ring seal 20 and a rotary seal element 22 mounted on a sleeve 11 via an O-ring seal 24, the sleeve 11 being connected and sealed onto the shaft 10.

Anti-rotation means (not shown) are provided to prevent the seal element 18 rotating with respect to the housing 12, the seal element 22 rotating with respect to the sleeve 11 and the sleeve 11 with respect to the shaft 10.

The seal element 22 comprises a carrier 26, a squeeze ring 28 and a seal face member 30. The carrier 26 has a spigot 27 between which and the squeeze ring 28 the seal face member 30 is compressed.

The seal elements 18 and 22 are pressed into contact along an annular seal surface 32 by spring means schematically shown at 53 retained between spring retainer 34 and collar 36 secured to the sleeve 11 by one or more grub screws 38.

Thus a running seal is formed at the surface 32 as the shaft rotates. To maintain a smooth regular surface 32 it is usual to make one of the surfaces smaller and of softer material than the other. In this embodiment the rotary seal element 22 has a seal face member 30 constructed from carbon. However, it should be appreciated that the element 22 could be arranged as the stationary seal element and the element 18 as the rotary seal element.

Moreover to prevent loss of fluid 14 even if the seal 16 should fail it is also quite possible to arrange a barrier fluid to fill the space generally designated 40 around the seal elements 18, 22 and be under great pressure than the fluid product 14. This keeps the product 14 from entering the fine gap present between the seal surfaces 32 which instead has a film of the barrier fluid chosen inter alia for its lubricating properties.

Moreover, because the seal face member 30 is enclosed substantially on three sides, as explained further below, the member exposes only a small surface 42 for attack by the fluid product 14 and thus enhances the long life of the member 30.

Turning to FIG. 2, this illustrates a seal element 22A which could be employed in the seal 16 of FIG. 1. This comprises a carrier 26A having a spigot 27 which supports seal face member 30. The squeeze ring 28A in this embodiment is simpler than that shown in FIG. 1. FIG. 6 illustrates diagrammatically the assembly of the seal element 22A of FIG. 2.

Under ambient temperature conditions, seal face member 30 has a slightly larger internal diameter A than the external diameter D of spigot 27. Moreover the member 30 has a larger external diameter B than the internal diameter C of squeeze ring 28A. To assemble the seal element the member 30 is first positioned on the spigot 27 with its back surface 29 in contact with the front surface 31 of carrier 26A. An O-ring 33 is first positioned in a groove 35 in the carrier 26A, (see FIG. 2). Then squeeze ring 28A is heated until it can be positioned over the outside surface of the member 30. On cooling, the squeeze ring 28A compresses member 30 into firm contact with the spigot 27, the squeeze ring 28A making radial abutment with the front surface 31 of the carrier 26A.

In use, rotational drive of the seal face member 30 is provided by the inteerference fit of the member 30 on the spigot 27. Selection of the correct amount of interference is determined by temperature and frictional drive considerations. Where the material of the member 30 is carbon as would normally be the case, then as the temperature of the seal increases in use the squeeze ring 28A expands more rapidly than the carbon. Thus the compression on the carbon is released and eventually its internal diameter returns to the value A.

The spigot 27 also expands from its external diameter D but more slowly than the carbon whose expansion is determined by the squeeze ring 28A. Nevertheless it can be arranged that all temperatures at which the external diameter of the spigot 27 is between D and A, the free internal diameter of the carbon is less than the external diameter of the spigot. Thus there is always an interference between the spigot 27 and member 30. As the temperature further increases however the member 30 is released from compression as the internal diameter of the squeeze ring 28A approaches B. Thereafter on further expansion of the spigot the carbon member 30 is placed under tension. In this condition however the carbon is very weak and is likely to break up.

Moreover, because the interference between spigot 27 and carbon 30 progressively decreases as the spigot expands from D to A and to allow a margin of safety from the point of view of the friction drive between the member 30 and spigot 27, it may be necessary to limit the temperature range of the seal to a maximum temperature corresponding to an external diameter of the spigot 27 at somewhat less than A. Nevertheless this maximum temperature is sufficiently high for most applications and indeed is not less than conventionally arranged carbon type seals are able to accommmodate.

Returning to FIG. 2 the carbon member 30 illustrated can be seen to be shrouded on three sides by the carrier 26, spigot 27 and squeeze ring 28A. Thus the available surface for attack by the fluid product is reduced to a small area 42.

Also the carbon member 30 is supported on three sides and hence the tendency for the face 32 to distort is reduced. Nevertheless with a high barrier fluid pressure in space 40 it is preferable to include an O-ring 33 behind the member 30 so preventing this pressure building up below the level of the centre of the face 32. If such pressure did build up there would be a net force on the member 30 tending to slide the latter off the spigot 27. A passage 44 formed in the carrier 26 drains any leakage of barrier fluid passed the O-ring 33.

Hydrostatic pressure still acts however on squeeze ring 28A as indicated by the arrows A in FIG. 3. While this serves to help retain the carbon member 30 on the spigot 27 it also adds to the load on the spigot. If the spigot deforms it does so in a way characterised by a free cantilever and as shown in FIG. 3. This allows hydrostatic pressure behind the member 30 notwithstanding the presence of the O-ring 33 and may cause substantial leak to occur through passage 44. Thus this passage may be omitted as indeed may the O-ring 33 and the interference between the member 30 and spigot 27 be relied on to keep the member from being pushed off the spigot. Nevertheless, if such a situation is likely to occur, such as in situations where there may be as much as 20 bar (2N/mm$^2$) pressure differential across the seal, then it is preferred to adopt the arrangement shown in FIG. 1 and in detail in FIG. 4.

Here the squeeze ring 28 has two thickened portions 50, 52 connected by a bridge 51. The first thickened portion 50 compresses the seal face member 30 onto the spigot 27 while the other portion 52 is a shrink fit onto the carrier external diameter 26. Thus the squeeze ring 28 circumferentially abuts both the face seal member 30 and the carrier 26.

Thus the friction between the portion 52 and carrier 26, which remains constant at all temperatures if they are constructed from the same material, and the friction between the portion 50 and carbon member 30, largely prevents the distortion illustrated in FIG. 3 from occurring. Distortion is in any event less likely because the hydrostatic pressure indicated by the arrows B in FIG. 4 is spread over the surface of the squeeze ring 28 and onto the thicker portions of carrier 26. This arrangement also reduces the possibility of hydrostatic pressure getting behind the member 30.

Finally, FIG. 5 illustrates another embodiment of face seal member 22B in which the spigot 27B of the carrier 26B functions as the squeeze ring of previous embodiments whilst a squeeze ring 28B functions as the spigot. Here the carrier 26B is heated to allow the carbon member 30 to be inserted into the bore of the spigot 27B. Then the squeeze ring 28B is cooled until it can be positioned in the bore of the carbon member 30. At this stage the member 30 under compression by the spigot 27B would have a slightly smaller internal diameter than that of the carrier 26B. However once the squeeze ring 28B warms and expands it further compresses the member 30 to conform with the internal diameter of the carrier. The squeeze ring 28B thus circumferentially abuts the inner surface of both the face seal member 30 and the carrier 26B.

This arrangement may be superior in consideration of distortion while having similar temperature capabilities of the above-described embodiments. It should be appreciated that the squeeze ring 28B of FIG. 5 could have a similar design as that shown in FIG. 4 and that in either case the diameters of the raised portions in contact with the member 30 and carrier 26 respectively need not necessarily be the same as shown in FIGS. 1 and 4.

In all the above-described embodiments however the features of a more rigid structural support for the carbon member 30 resulting from the abutting relationship radial or circumferential between the squeeze ring and carrier, and a shrouding of the carbon member respectively reduce the occurrence and/or severity of distortion of the face 32 of the carbon and protect the carbon from attack by hostile fluid product in a way not achieved hitherto.

What is claimed is:

1. A mechanical seal for use in sealing a rotary shaft exiting a housing containing fluid to be sealed in the housing, the mechanical seal comprising:
    a. a stationary seal element adapted to be sealed in the housing;
    b. a rotary seal element adapted to be sealed to the shaft;
    c. the stationary and rotary seal elements each having an annular seal face adapted to surround the shaft;
    d. means urging the rotary and stationary seal elements toward each other to form a running seal between the annular seal faces; and
    e. one of the seal elements including:
        i. a portion near an axial end of the seal element defining a carrier;
        ii. a spigot on the carrier and axially thereof closer to said end;
        iii. a seal face member defining said annular seal face on the one seal element, said seal face member being adjacent the spigot in circumferential abutment with the spigot and axial abutment with the carrier along a radial surface, said seal face member on the one seal element forming said running seal with the other seal element; and
        iv. a squeeze ring shrink fitted onto the face seal member and the carrier circumferentially to abut both the face seal member and the carrier and axially to enclose the seal face member.

2. A mechanical seal according to claim 1 in which the squeeze ring comprises two axially spaced thickened portions separated by a relatively thin bridge, one of the thickened portions circumferentially abutting the seal face member and the other thickened portion circumferentially abutting the carrier.

3. A mechanical seal according to claim 1 in which the dimensions of the seal face member, the carrier and the squeeze ring are such that the seal face member is under radial compression when assembled.

4. A mechanical seal according to claim 1 in which the seal face member is constructed from a material having a thermal expansion coefficient substantially less than that of the materials of the carrier and/or squeeze ring.

5. A mechanical seal according to claim 4 in which the seal face member is constructed from carbon or carbon based material.

* * * * *